UNITED STATES PATENT OFFICE.

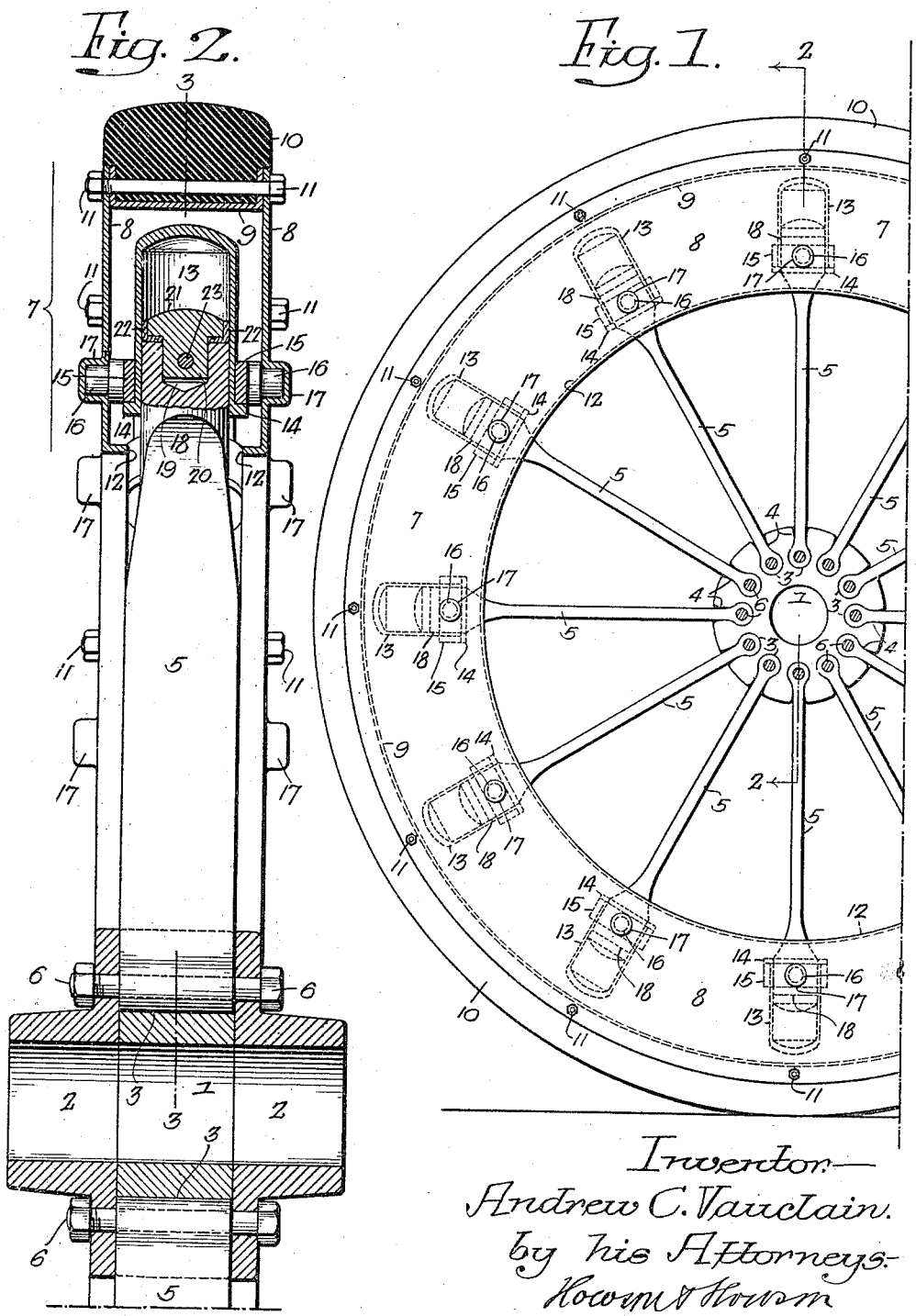

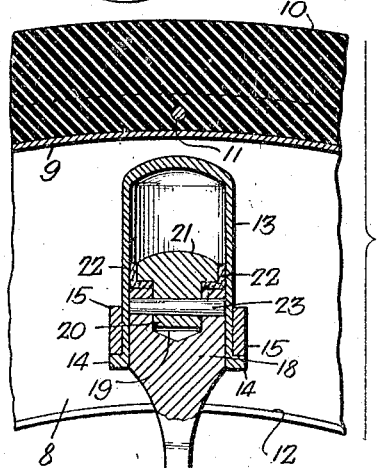
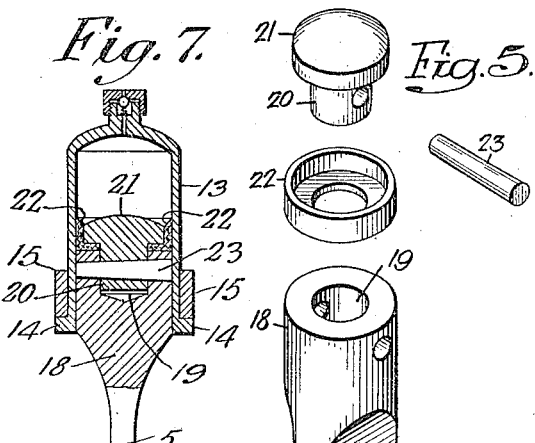
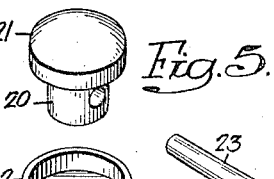
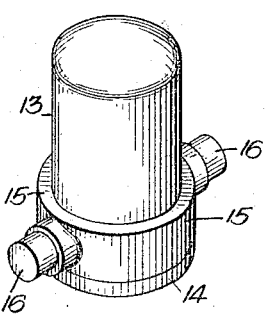
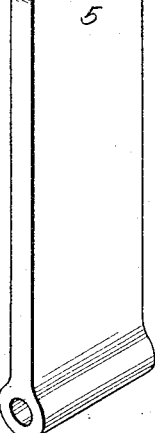
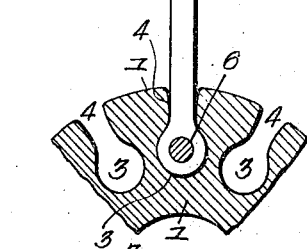
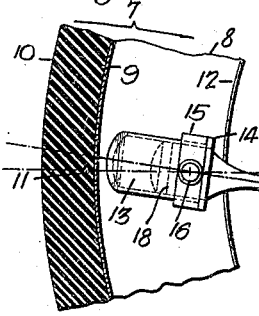
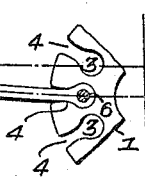

ANDREW C. VAUCLAIN, OF PHILADELPHIA, PENNSYLVANIA.

VEHICLE-WHEEL.

1,293,994.  Specification of Letters Patent.  Patented Feb. 11, 1919.

Application filed March 24, 1917. Serial No. 157,104.

*To all whom it may concern:*

Be it known that I, ANDREW C. VAUCLAIN, a citizen of the United States, residing in Philadelphia, Pennsylvania, have invented certain Improvements in Vehicle-Wheels, of which the following is a specification.

My invention relates to certain improvements in wheels of the type having a certain amount of resiliency so as to absorb the shock between the frame of the vehicle and the ground.

The invention is particularly adapted for use in power driven vehicles, especially those using solid tires.

One object of the invention is to construct the wheel so that each individual spoke will act as a piston within a cylinder to store a sufficient amount of air to form a cushion.

Another object of the invention is to design the spokes so that they will have a certain amount of flexibility and also to design the cylinders so that they will accommodate themselves to the flexible spokes.

A still further object of the invention is to attach the spokes rigidly to the hub and to mount the cylinders in the rim of the wheel.

In the accompanying drawings:

Figure 1 is a side view of a portion of a wheel illustrating my invention, the side plates of the hub being removed;

Fig. 2 is a sectional view on the line 2—2, Fig. 1, drawn to an enlarged scale;

Fig. 3 is a section on the line 3—3, Fig. 2;

Fig. 4 is a detached perspective view of one of the cylinders;

Fig. 5 is a perspective view of one of the spokes and piston, the parts of the piston being detached;

Fig. 6 is a view in diagram, showing the location of the parts when the spokes are flexed; and Fig. 7 is a view of a modification.

Referring to the drawings, 1 is the central portion of the hub. 2, 2 are the side plates having flanges. The hub is recessed, as at 3, and slotted at 4 to receive the ends of the spokes 5. The bolts 6 extend through openings in the ends of the spokes and through the flanges of the side plates 2 of the hub, as clearly shown in Fig. 2. The edges of the walls of the slots 4 are slightly rounded so as to prevent the cutting of the spokes when they are flexed. 7 is the rim of the wheel, formed of two plates 8 connected by an annular plate 9, flanged, as shown. These plates form a recess for the body portion of the tire 10, which is of solid rubber in the present instance, the tire being secured to the plates by a series of transverse bolts 11. The inner ends of the plates are flanged, as at 12, to form a finish to the wheel and to act as a mud guard to prevent the mud to some extent from entering the space in which the cylinders are mounted.

Mounted in the rim of the wheel is a series of cylinders 13, one for each spoke. Each cylinder has a flange, as at 14, at its open end and is closed at the outer end and each cylinder is mounted in a ring 15 having trunnions 16 adapted to fit bearings 17 formed by pressing the metal of the plates 8, as clearly shown in Fig. 2, so that the cylinders are free to turn in the rim 7. The spokes 5 are flat throughout the greater portion of their length and at one end are shaped to form a piston 18 adapted to the open end of a cylinder 13. The piston has an opening 19 at the center adapted to receive the stem 20 of a cap 21 between which and the end of the piston is located an ordinary cup ring 22. The cap is held to the piston by a tapered plug 23, as clearly shown in Figs. 2 and 3. It will be noticed that each piston extends beyond the pivot of its cylinders so that the strain, due to the movement of the wheel, is taken by the trunnions of the cylinder, avoiding unnecessary twists or strains on the piston within the cylinder when the spokes are flexed, due to the movement of the wheel over the ground, as shown in Fig. 6.

The action of the wheel is as follows:

When the wheel is detached from a vehicle the points are in the position illustrated in Fig. 1. The air is practically under atmospheric pressure in all of the cylinders and the several spokes are straight, but when the wheel is mounted on a vehicle, then the weight of the vehicle will slightly deflect the spring spokes and force the lower piston into its cylinder to a greater depth than the piston in the upper cylinder, and, the moment the vehicle is moved, the vibration immediately causes the pistons to reciprocate in their cylinders and to store up a given amount of air under pressure, depending upon the roughness of the road over which the vehicle travels, consequently, the wheel absorbs the shock. While the pistons have the usual working fit in the cylinders the cup packing is so arranged that when the pistons move into their cylinders the air is compressed therein and there is sufficient leakage to allow the pistons to move outward during a certain portion of the movement of the wheel. The pistons that are on the vertical line of the wheel move in the cylinders without flexing their spokes and the spokes that are horizontal are flexed to a greater extent than the other spokes, and their cylinders accommodate themselves to the movement of the spokes by turning on their trunnions. The other spokes of the wheel are flexed in proportion, consequently, the pistons have a full movement in the cylinders when they are in the vertical position without flexing the spokes, and this movement is taken up in the other spokes, partly by the movement of the pistons in the cylinders and partly by the flexing of the spokes, making a very easy riding wheel and one that will automatically store up air in the cylinders after the vehicle is running for a certain length of time.

In some instances, the cylinders may be provided with small leakage ports at their outer ends to allow the water of condensation to escape from the cylinders and to allow a certain amount of air to enter the cylinders, and, in some instances, the leakage ports may have check valves therein, as shown in Fig. 7.

I claim:

1. The combination in a vehicle wheel, of a hub; a rim; a series of cylinders having trunnions pivotally mounted in the rim, the trunnions being located near the open ends of the cylinders, said cylinders being closed at their outer ends; a series of flat spring spokes mounted in the hub of the wheel and enlarged at their outer ends to form pistons, the pistons being normally within the cylinders and beyond the line of the trunnions; and cup packing carried by each piston so that when the wheel is in motion the pistons act to accumulate air under pressure in the cylinders, the pivots of the cylinders allowing the spokes to be flexed.

2. The combination in a vehicle wheel, of a hub; a rim; a series of rings, said rings having trunnions adapted to bearings in the rim of the wheel; a cylinder in each ring, the cylinders being closed at their outer ends and flanged at their inner ends; a series of flat spring spokes mounted in the hub of the wheel and enlarged at their outer ends to form pistons; cup packing carried by each piston; and a cap for holding the packing in place so that when the wheel is in motion the pistons act to accumulate air under pressure in the cylinders, allowing the spokes to be flexed.

3. The combination in a vehicle wheel, of a hub; a rim; a series of bearings formed in the rim; a series of open-ended cylinders having trunnions and mounted in the bearings in the rim; a series of flat spokes pivotally connected to the hub, each formed of one solid piece with a piston, said piston passing beyond the line through the trunnions so that any flexing of the spokes will be between the trunnions and the hub, the cylinders accommodating themselves to the position of the piston; and cup rings mounted in each piston having their ends turned inward so as to compress the air in the closed end of the cylinders.

In witness whereof I affix my signature.

ANDREW C. VAUCLAIN.

Copies of this patent may be obtained for five cents each, by addressing the "Commissioner of Patents, Washington, D. C."